United States Patent
Himmel et al.

(10) Patent No.: US 6,237,035 B1
(45) Date of Patent: May 22, 2001

(54) SYSTEM AND METHOD FOR PREVENTING DUPLICATE TRANSACTIONS IN AN INTERNET BROWSER/INTERNET SERVER ENVIRONMENT

(75) Inventors: Maria Azua Himmel; Richard Dale Hoffman, both of Austin; Michael Gerard Mall, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/993,607

(22) Filed: Dec. 18, 1997

(51) Int. Cl.⁷ .................................................... G06F 13/00
(52) U.S. Cl. ........................................... 709/224; 709/203
(58) Field of Search ................... 705/26; 395/187.01, 395/600, 18.01, 700; 707/10, 1, 4, 201, 7, 505, 103; 380/25; 709/302, 203, 218, 224, 220; 345/342; 358/296; 370/331

(56) References Cited

U.S. PATENT DOCUMENTS

| | | | | |
|---|---|---|---|---|
| 5,202,982 | * | 4/1993 | Gramlich et al. ................. | 395/600 |
| 5,313,635 | * | 5/1994 | Ishizuka et al. ................... | 395/700 |
| 5,347,269 | * | 9/1994 | Vanden Heuvel et al. ..... | 340/825.44 |
| 5,553,143 | * | 9/1996 | Ross et al. ........................ | 380/25 |
| 5,699,513 | * | 12/1997 | Feigen et al. ................... | 395/187.01 |
| 5,724,510 | * | 3/1998 | Arndt et al. ..................... | 709/220 |
| 5,751,956 | * | 5/1998 | Kirsch ............................. | 709/203 |
| 5,774,664 | * | 6/1998 | Hidary et al. .................. | 709/218 |
| 5,793,495 | * | 8/1998 | Klotz, Jr. ........................ | 358/296 |
| 5,838,318 | * | 11/1998 | Porter ............................. | 345/342 |
| 5,842,211 | * | 11/1998 | Horadan et al. ............... | 707/10 |
| 5,864,863 | * | 1/1999 | Burrows .......................... | 707/103 |
| 5,884,304 | * | 3/1999 | Davis, III et al. ............... | 707/4 |
| 5,899,980 | * | 5/1999 | Wilf et al. ....................... | 705/26 |
| 5,903,721 | * | 5/1999 | Sixtus ............................. | 395/187.01 |
| 5,905,979 | * | 5/1999 | Barrows ......................... | 707/1 |
| 5,920,696 | * | 7/1999 | Brandt et al. ................... | 709/218 |
| 5,930,472 | * | 7/1999 | Smith ............................. | 709/203 |
| 5,941,944 | * | 8/1999 | Messerly ........................ | 709/203 |
| 5,949,771 | * | 9/1999 | DeClerck et al. .............. | 370/331 |
| 5,966,714 | * | 10/1999 | Huang et al. ................... | 707/201 |
| 5,968,134 | * | 10/1999 | Putzolu et al. .................. | 709/302 |
| 5,999,929 | * | 12/1999 | Goodman ...................... | 707/7 |
| 6,108,646 | * | 8/2000 | Mohri et al. ................... | 707/1 |
| 6,108,673 | * | 8/2000 | Brandt et al. ................... | 707/505 |
| 6,122,372 | * | 9/2000 | Hughes .......................... | 380/2 |

* cited by examiner

*Primary Examiner*—Robert D. Harrell
*Assistant Examiner*—Thong Vu
(74) *Attorney, Agent, or Firm*—Mark S. Walker; Jeffrey S. LaBaw

(57) ABSTRACT

A system and method for controlling duplicate transaction submission in a web browser/web server environment. The client web browser is modified to include a process duplicate action select (e.g. duplicate mouse "clicks") detection. This process establishes a variable for an action indicating whether the action has been previously selected. Upon selection, the process tests the action variable and passes the transaction request if not previously submitted and returns an error otherwise. The server process has been augmented with a duplicate transaction process. The server software inserts a _tranid parameter into each of a plurality of selected pages returned to a browser for transaction processing. The server maintains a record of the last used jranid. The server compares a tranid returned in a user request to the recorded value. If previously processed, an error is returned to the requester. If not previously processed, the recorded "last transaction id" is updated and the request fulfilled.

18 Claims, 4 Drawing Sheets

This processing occurs on the web server when a user requests a page in order to perform a transaction. For example, when the user clicks on a 'I want to do transfer' icon, the server will build a transfer request page that the user can fill in with data. Part of building that page is to get a new transaction id (tranid) and put it into 'do the transfer' URL.

This routine executes when a user submits a request to the web server. It checks if the transaction identified by the tranid has been processed before. If not, the request is processed. If so, the request is not done a second time. The processing in the box is contained in the CheckDupTran function.

SYSTEM AND METHOD FOR PREVENTING DUPLICATE TRANSACTIONS IN AN INTERNET BROWSER/INTERNET SERVER ENVIRONMENT

BACKGROUND OF THE INVENTION

1. Field of the Invention

The present invention relates to computer processor implemented transaction processing systems. More particularly, the present invention relates to transaction control mechanisms for ensuring the reliability and integrity of transactions processed in an on-line transaction processing system. Still more particularly, the present invention relates to transaction processing over the Internet using Internet browsers and Internet servers to process on-line transactions.

2. Background and Related Art

Computer implemented transaction processing systems are used to manage information collected and used by businesses worldwide. Historically, transaction processing has been used by banks and airlines to handle customer transactions. In both of these industries, the accuracy of the data is a prime concern. Transaction processing systems have been designed to ensure that data is properly updated and that any failure of the system is handled in a predictable and recoverable manner.

The widespread implementation of Internet technology has created a demand to enable consumers to directly enter transactions with their banks and to make reservations with travel companies. Implementation of client driven transaction processing systems must meet the high data integrity requirements consumers expect. For example, consumer use of an Internet banking program to transfer funds must result in the funds either being fully transferred into the correct account, or the transaction being terminated with a reported error.

The problem of duplicate transaction entry is of particular interest The processing system must ensure that a specific transaction is processed once and only once. Unfortunately, Internet browser technology makes duplicate transaction entry relatively common. Internet browsers have been developed to access and view data over the worldwide web. Viewing and even non-financial data entry are usually not harmed by duplicate transaction submissions. Financial transactions cannot tolerate duplicate entries.

Duplicate transactions occur, in part, because of the stateless nature of browser/server applications. The server supplies a "web page" to the client browser for action by the user. The prior art servers do not retain any state information about the form supplied. When the browser submits the form, it is acted upon by the server, again without monitoring the previous state of the application. The user can cause the same form to be submitted a second time without the server detecting the duplication.

Browser technology allows the following types of duplicate transaction entries to occur. Note that the 'enter' button in the following items denotes the page element that the user clicks on to submit a transaction. It could be a form submit button, a form image button, or an HREF.

1. Enter-Back-Enter The user submits a transaction by clicking on an enter button. The user sees the response. Later the user uses the browser's 'back' button to back up into the previously submitted transaction and clicks on enter again 2. Enter-Reload: Here the user submits a transaction by clicking on an enter button. The user sees the response and then clicks on the browser 'reload' button (called 'refresh' in the Internet Explorer browser). Clicking the reload button causes the transaction to be sent to the web server a second time.

3. Enter-Stop-Enter: The user submits a transaction by clicking on an enter button. While waiting for the response the user clicks the browser 'stop' button and the clicks the enter button again. Clicking the enter button the second time submits the transaction to the web server a second time.

4. Multiple-Clicks: If a user clicks multiple times on an enter button, browsers may submit multiple identical transactions to the web server. The behavior of the browsers differs based upon which browser is used (Netscape Navigator is different than Microsoft Internet Explorer), the HTML type of the enter button, and how many clicks were entered.

5. Resize: Resizing the browser window may, in some instances, cause the browser to reload the transaction in the browser window.

Each of these situations results in an undesirable duplication of transaction processing. A technical problem therefore exists to prevent duplicate transaction processing in a browser/server environment.

SUMMARY OF THE INVENTION

The present invention solves the duplicate transaction processing in a browser/server environment by implementing checks on both the client browser side and server side of the transaction. Client programs running on the browser are be restructured to eliminate duplicate transaction submission. Server systems are assembled to track form submission and to reject any duplicate forms.

[claim language]

It is therefore an object of the invention to eliminate duplicate transaction submission in a browser/server environment.

It is yet another object of the invention to prevent duplicate processing of a transaction submitted from a browser.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Internet applications are implemented with a client "browser" for user interaction and a server for application processing. The client browser is graphically oriented and presents a graphical page of data (or screen) to the user for action. Data can be entered into defined fields and actions can be requested by clicking a pointing device, such as a mouse, on an action "button" or on specially defined fields on the screen.

Internet servers process requests submitted by the browsers. Servers locate and present requested data to the user using forms defined according to the HyperText Markup Language standard (HTML.) This standard defines the content of a form to be displayed by the browser and the actions the user will be permitted to take. The server and browser software need not be from the same vendor. Servers must be responsive to any valid HTML request from a browser and browsers must be responsive to server generated forms. Internet server software is marketed and sold by Netscape Communications Corp., IBM Corp., Microsoft Corp. and others. Browser software is available from these and other vendors.

Application logic is typically stored in the server and executed in response to a browser request Some logic, however, can be downloaded to the client browser as a part of the form to be executed in response to a user action. This logic is typically coded in the JavaScript interpretive language developed by Netscape Communications Corp. JavaScript implements programming statements that permit client based action processing.

Figure 1:
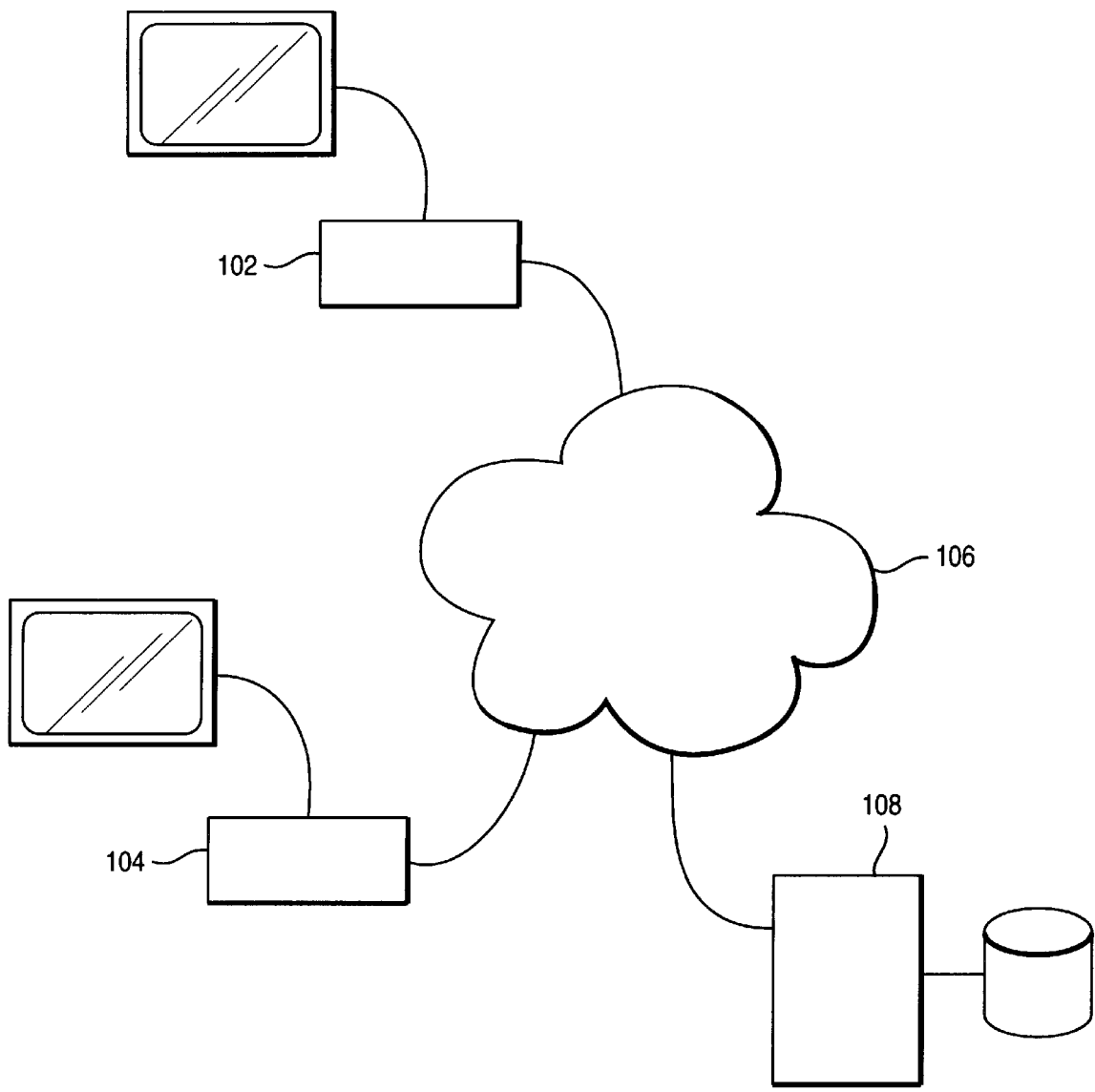
FIG. 1 is a block diagram illustrating the computer environment of the preferred embodiment of the present invention.

The present invention is implemented in an Internet or Intranet (within one organization) system such as that shown in FIG. 1. Any number of client workstations with browser software 102, 104 are connected through a network 106 to an Internet server 108 running server software. The network 106 can be any of a variety of known or to be developed local area network or wide area network topologies.

Figure 2:
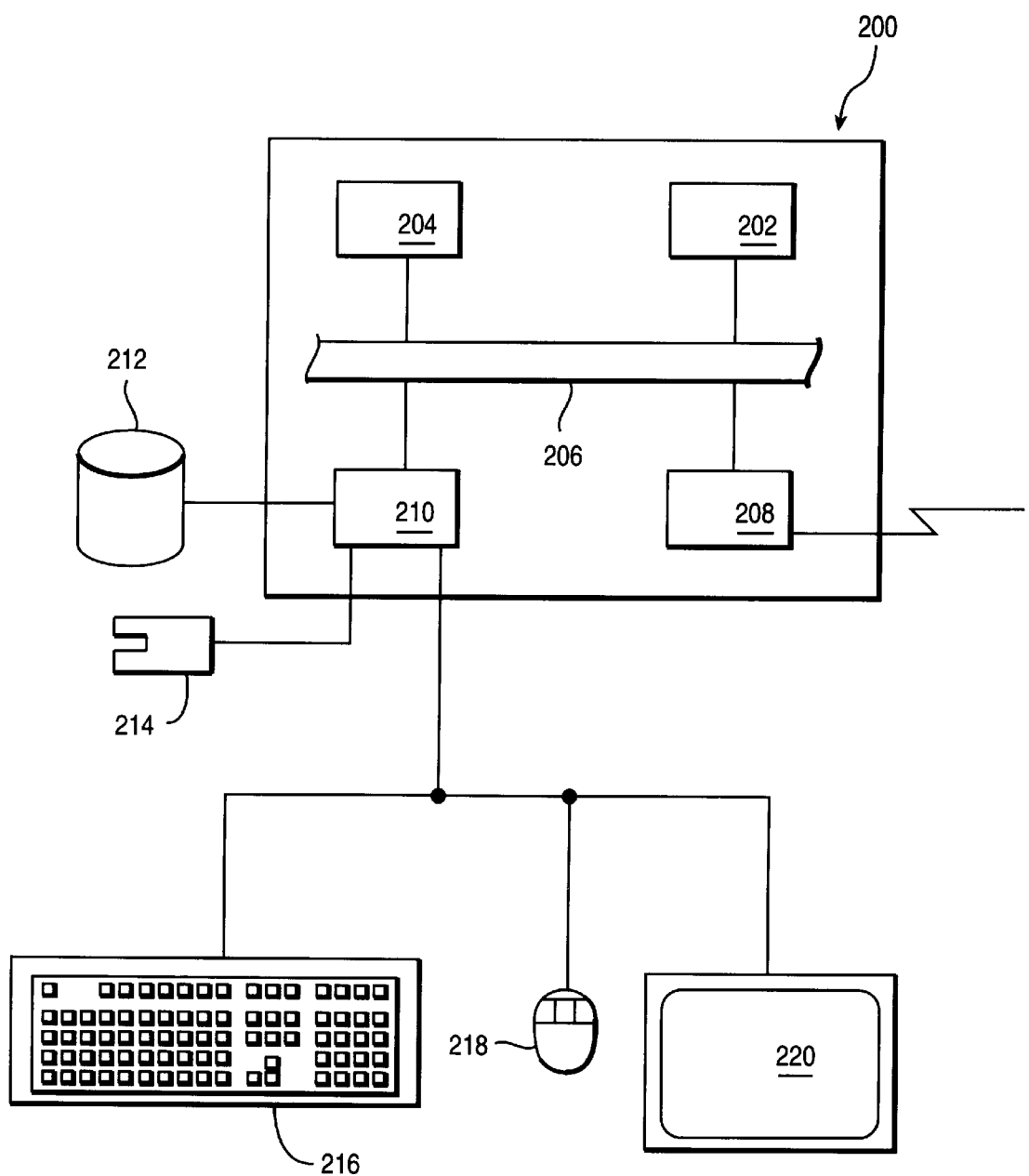
FIG. 2 is a block diagram of a computer system according to the present invention.

The client and server computer systems will be similar to that illustrated generally in FIG. 2 at 200. It will have a processing unit 202 with one or more central processing units (CPUs) connected through a system bus 206 to random access memory 204. Network controller 208 controls data exchange over the network. Input/output controller 210 manages interaction with fixed storage 212, removable storage 214 and user input devices such as keyboard 216, pointing device 218 and display monitor 220. The preferred embodiment employs and IBM Personal Computer as the client computer and an IBM RS/6000 workstation as the server computer. The invention is not limited, however, to any particular computer type or configuration, except as specified in the claims.

The preferred embodiment solves the duplicate transaction problem by first eliminating duplicate transaction submission on the client side where possible, and avoiding duplicate transaction processing on the server side in all cases. Avoiding duplicate submission is desirable even when duplicate processing is avoided due to the elimination of the network traffic associated with the duplicate submission.

The client side solution is based on monitoring transaction submission requests and detecting duplicates. The preferred embodiment is implemented as a JavaScript language logical routine to examine transaction submission. A description of client side submission processing is necessary before describing the preferred embodiment in detail.

A user interacts with a server application through an HTML form sent to the user client browser by the server. The HTML language specifies certain constructs for "submitting" a form or trasaction back to the server. Submission causes the client browser to transmit specified data back to the server for action. The HTML constructs (or page elements) typically used to cause a request to be sent to a server are:

1. A FORM with an input type=submit button.
<FORM METHOD=. . . >
<INPUT TYPE="submit" value="Enter">
2. A FORM with an input type=image button
<FORM METHOD=. . . >
<INPUT TYPE="image" SRC="enter.gif">
3. A text HREF.
<A HREF="pageref.html?parms=xxx">
Click Here To Submit Transaction.
</A>
4. An image HREF.
<A HREF="pageref .html?parms=xxx">
<IMG SRC="enter.gif">
</A>

If a user clicks once on any of the above types, all versions of Netscape Navigator and Microsoft Internet Explorer (IE) browsers will send a request to the specified web server. However, a browser's response to a user double clicking or triple clicking on the above types is different based on type.

The following Table 1 shows how the Netscape Navigator 3, Microsoft IE 3.02, and Netscape Communicator 4 browsers react when a user double clicks on the various page elements.

TABLE 1

| Page Reference Type | NS Navigator 3 | MS IE 3.02 | NS Communicator 4.01a |
|---|---|---|---|
| TYPE = "submit" | 2 Transactions | 2 Transactions | Usually 1 |
| TYPE = "image" | Usually 1 | Usually 1 | Usually 1 |
| Text HREF | Occasionally 2 | Usually 1 | Usually 1 |
| Image HREF | Ocassionally 2 | Usually 1 | Usually 1 |

The term 'usually 1' indicates that most of the time (greater than 95% in the authors testing) only a single transaction is sent to the web server. The term 'occasionally 2' means that the majority of the time (>50%) only a single transaction was sent. However, depending upon the speed at which the double click was done, the author could get 2 transactions sent more ofien than the 'usually 1' case.

The situation changes when the user triple clicks on the page elements. Often one would see 2 transactions submitted in this case.

The Netscape JavaScript language includes features that enable JavaScript logic to be executed whenever the user clicks on a page element. The JavaScript event handlers get control whenever a user clicks on a page element. The present invention is directed to a novel structure of computer readable program code that causes an event handler to prevent the browser from submitting multiple transactions when the user clicks multiple times on a page element.

The method for intercepting page element events differs between the types of page elements. The <FORM> page element enables an "onSubmit" Javascript event handler routine to be specified. The routine will be called "checkIfSubmitted( )" This looks like:

<FORM METHOD=. . . onSubmit="return checkIfSubmitted( )">

The HREF page elements enables an "onClick" Javascript event handler routine to be specified.

```
<A HREF="pageref.html?parms=xxx" onclick="return
   checkIfSubmitted( )">
```
The checkIfSubmitted( ) routine is a client side Javascript routine provided by the page developer. Following is a checkIfSubmitted( ) Javascript event handler according to the present invention:

```
<SCRIPT>
var submitForm="yes";
function checkIfSubmitted () {
     if (submitForm=="yes") {
        submitForm="no";
        return(true); }
     else {
        return(false); }
  }
</SCRIPT>
```

The use of onsubmit and onClick event handlers prevents duplicate transactions from being submitted on multiple clicks by the Netscape Navigator 3 and Communicator 4 browsers.

However, the Internet Explorer 3.02 browser only recognizes the onSubmit event handler on the FORM type=submit page reference type. IE 3.02 ignores the onSubmit event handler on the FORM type=image reference and the onClick event handler on HREF references. Fortunately, IE 3.02 does not frequently send multiple transactions on the page reference types on which it ignores the event handler.

Figure 3:
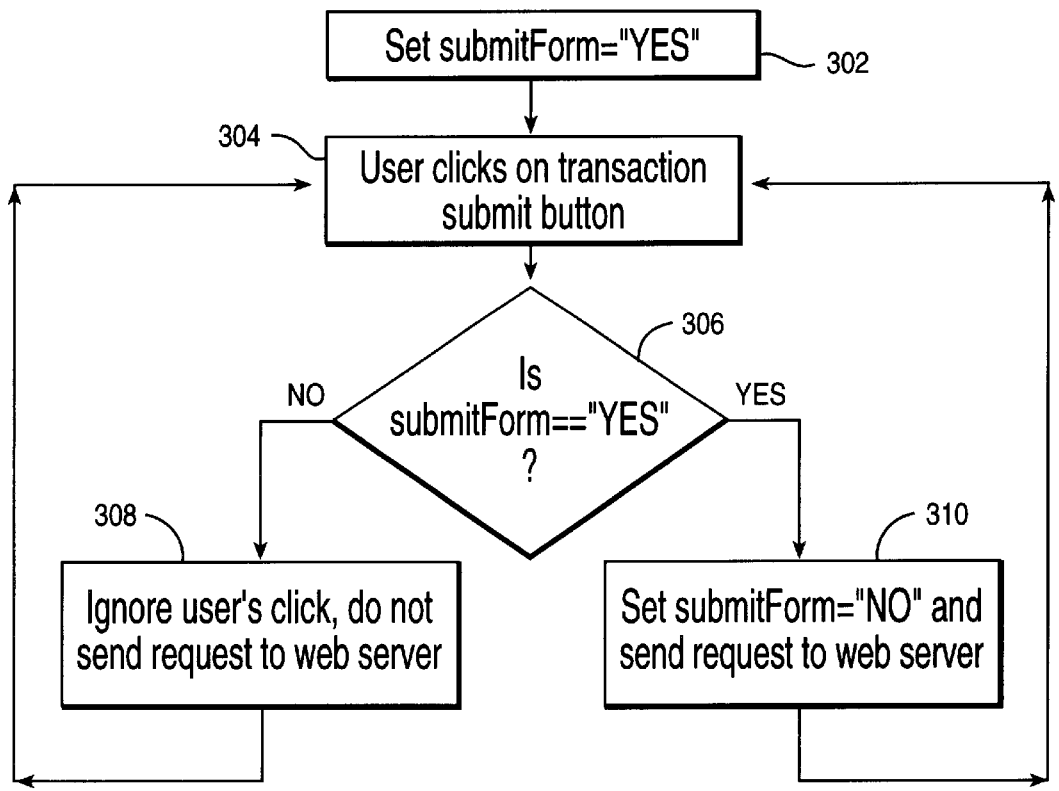
FIG. 3 is a flow chart of the process of client side duplicate action selection detection according to the present invention.

The process flow for client side duplicate transaction avoidance is illustrated in FIG. 3. On entry into the form the variable "submitform" is set to "yes" 302. When the user clicks a select button 304 the JavaScript checks whether the variable submitForm is "yes" 306. If "yes", the submitForm variable is set to "no" and the request sent to the server. If submitForm is "no" the user selection is ignored and no request sent Server side duplicate transaction processing is required to ensure that duplicate transactions are not entered in spite of multiple click detection on the client. The client browser user can cause a duplicate transaction to be submitted in other ways. Duplicate detection on the server side is based on a transaction sequence number ("tranid").

A transaction sequence number is assigned to each form sent to the browser for processing. The server detects any duplicate submission of a form containing a particular transaction sequence number. The server side detection logic includes the following steps:

1. The tranid of the last completed transaction for the user is saved in the web server.

2. Pages that contain a page reference link which can submit a transaction must contain a tranid. The page must obtain a new tranid to put into the reference link. This new tranid must be larger than the last completed transaction tranid saved in the web server.

3. When a page gets control to submit a transaction, the page must compare the tranid passed in the reference link to the tranid of the last completed transaction. If the tranid in the reference link is greater than last completed transaction tranid, then this is a new request from the user. The tranid from the reference is put into the last completed transaction tranid and the user's transaction is processed. If the tranid in the reference is less than or equal to the last completed transaction tranid, then the user's request is a duplicate and should not be processed again.

Figure 4:
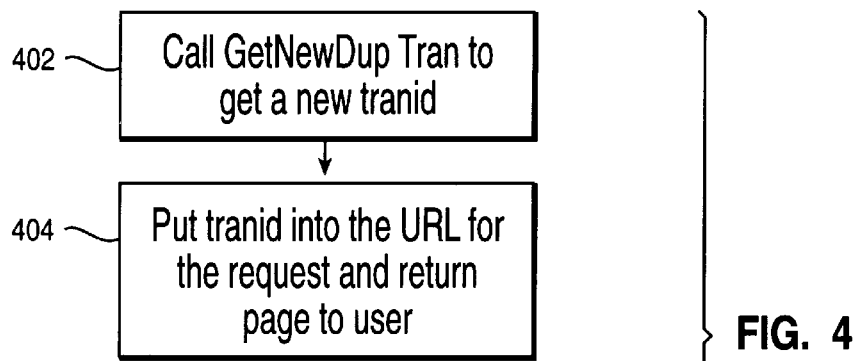
FIG. 4 is a flow chart of the process of server side transaction sequence number assignment according to the present invention.

Obtaining a tranid for a page and adding it to the page follows the process illustrated in FIG. 4. The server program building the page for transmission to the client requests a tranid using a GetNewDupTran( ) function 402. This function is written in JavaScript in the preferred embodiment and maintains the assigned number sequence. A __tranid history is maintained for each client (user). The tranid is inserted into the URL for the page and the page returned to the user 404.

Server side duplicate detection is performed using the CheckDupTran( ) procedure. CheckDupTran( ) compares the tranid returned by a form to the sequence maintained at the server and signals an error whenever the comparison indicates duplicate submission. The two server side procedures are described below.

GetNewDupTran( ): This function returns a character string tranid for a new transaction. This string must be put into a __tranid parameter in the URL.

CheckDupTran( ): This function compares a tranid obtained from the URL __tranid parameter and atomically compares it to the last completed transaction tranid from this user. If the URL __tranid is greater than last completed transaction tranid, then the function makes URL __tranid the last completed transaction tranid and returns a value of 0. Otherwise, the transaction represented by request.__tranid is a duplicate transaction and the function returns a non-zero value.

In the preferred embodiment, the above routines are written as C language programs that can be invoked from JavaScript. The C language routines implement the tracking of transaction sequence number values and transaction states. In addition, they are used to perform the compare operations. Those skilled in the art will recognize that other programming languages can be used to implement these functions without departing from the invention.

The server software must insert a __tranid in each form send to the client browser. The __tranid can be inserted as a hidden parameter in the form or as a variable in an HREF statement. The following demonstrates how GetNewDupTran( ) is used in server side Javascript to put the __tranid parameter variable as a hidden parameter in a <FORM>:

write('<FORM METHOD=. . . >');
   write('<INPUT TYPE="hidden" NAME="__tranid"
      VALUE='+GetNewDupTran( )+'>');

The following demonstrates how GetNewDupTran( ) is used to put the __tranid parameter on a HREF.

write('<A HREF="pageref.html?__tranid='+
      GetNewDupTran( )+'>');
   write('Click Here To Submit Transaction.');
   write('</A>');

The following demonstrates how CheckDupTran( ) is used to check whether a transaction is a duplicate. The following examples are based on an embodiment used by a bank to process banking transactions. The example assumes a bank wants to redirect processing to a page called duperr.html in the event a duplicate transaction is detected.

if (CheckDupTran( )!=0)
      redirect (addClient('duperr.html'));

The server side bank page customizer is responsible for getting the __tranid into the request URLs and putting the CheckDupTran( ) into the appropriate page execution paths. A bank can select which transactions it wants to check for duplicates. A bank may not care if duplicate inquiry type transactions are sent by a user. Additionally, navigation type URLs (such as those associated with icons across the top of a page) must not have duplicate checking done in their execution paths. (If this was done, clicking the navigation button a second time would cause a duplicate transaction to be detected.)

Server side duplicate transaction detection code must cause a response to be sent back to the user telling the user that a duplicate transaction has been detected The user needs to be told:

1. What happened?
2. Was the duplicate transaction processed (Was it sent to the bank)?
3. What caused the problem?
4. What can user do to avoid the problem?
5. How does the user continue the banking session?

Following is an example response which attempts to answer the above questions:

"You submitted a transaction which is a duplicate of a previous transaction. The duplicate transaction has not been processed. You may have caused the duplicate transaction by one of the following actions:

Using the browser "Back" button and submitting a transaction.

Using the browser "Reload" or "Refresh" button.

Using the browser "Stop" button and submitting a transaction.

Double mouse clicking when submitting a transaction.

You can avoid submItting duplicate transactions by using the navigation links provided on the banking pages. Avoid the use of the browser 'back', 'stop' and 'reload' buttons during a banking session. Click your mouse only once when you submit a transaction.

You may continue your banking session by clicking a navigation link on this page."

Figure 5:
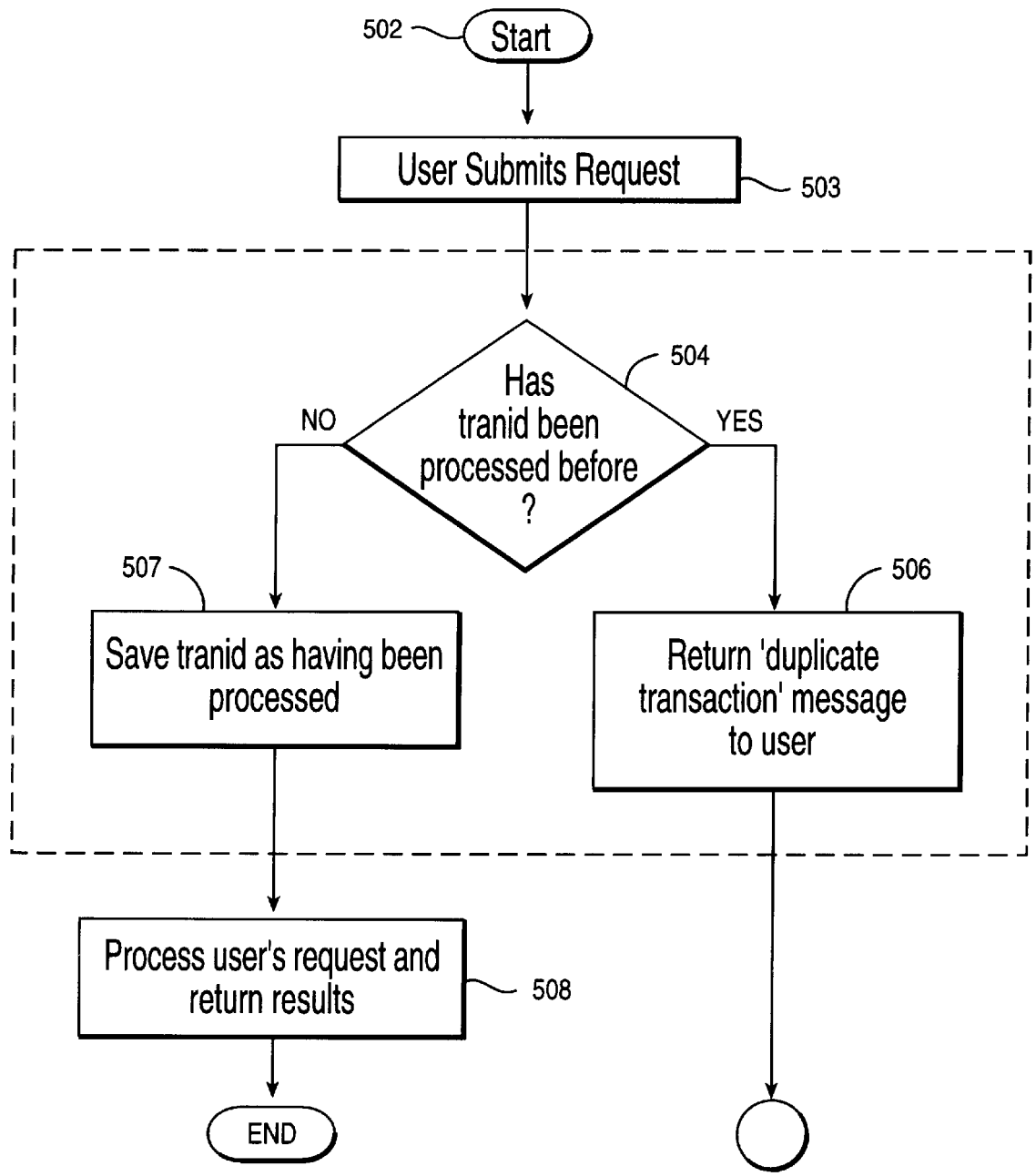
FIG. 5 is a flow chart of the process of server side duplicate transaction detection according to the present invention.

The server side processing is illustrated in FIGS. 4 and 5. FIG. illustrates the process flow for inserting a \_tranid into a URL. The server side process acquires a new tranid by invoking the GetNewDupTran( ) process 402. This tranid is inserted into the URL and the page returned to the user 404.

FIG. 5 illustrates the process of duplicate detection. The server process starts at 502 and receives a user request with a returned page containing a \_tranid 503. The server checks whether this \_tranid has been previously processed 504 using, for example, a routine such as CheckDupTran( ). If he tranid was previously processed, a "duplicate transaction" message is returned to the user 506 and processing terminates. If the tranid has not been processed, the tranid is saved as having been processed 507 and the user request in the transaction is processed 508.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer implemented method for eliminating duplicate request submission from a browser to a server in a browser/server environment, the browser operating on a client computer processor having client memory and client processing means, the method comprising the steps of:

setting an indicator to a first state in the client memory;

detecting a request submission at the client to send a request to the server; testing said indicator, and if said indicator is set to said first state, then submitting the request to the server, and resetting the indicator to a second state, if said indicator is set to said second state, ignoring the request submission and raising an error condition;

thereby reducing network traffic associated with duplicate request submissions.

2. The method of claim 1, wherein said detecting step detects the request submission by a pointing device means selection of an HTTP FORM "submit" button.

3. The method of claim 1, wherein said detecting step detects the request submission by a pointing device means selection of an HTTP HREF selection.

4. A computer implemented method for avoiding duplicate transaction entry in a browser client/server environment, the method comprising the steps of:

detecting duplicate submission requests at said client and not submitting said duplicate submission requests to the server thereby reducing network traffic associated with duplicate request submissions;

detecting duplicate submitted transactions at said server and rejecting said duplicates.

5. The method of claim 4, wherein said detecting duplicate submission requests at said client comprises the steps of:

setting an indicator to a first state in a client memory;

detecting a request submission at the client to send a request to the server;

testing said indicator, and if said indicator is set to said first state, then submitting the request to the server, and resetting the indicator to a second state, if said indicator is set to said second state, ignoring the request submission and raising an error condition.

6. The method of claim 5, wherein said detecting duplicate submitted transactions at the server comprises the steps of:

setting a unique transaction identifier for a form in a web page returned to said setting a unique transaction client to begin a transaction;

receiving a submitted request including said form and returned transaction identifier;

testing said returned transaction identifier to determine whether or not said transaction identifier has been previously returned;

if previously returned, raising an error condition.

7. The method of claim 6, wherein said transaction identifier is a numeric sequence number and wherein said process maintains in a memory means a value of the highest returned transaction identifier, and wherein said testing said returned transaction identifier tests said returned identifier against said maintained value.

8. The method of claim 4, wherein said detecting duplicate submitted transactions at the server comprises the steps of:

setting a unique transaction identifier for a form in a web page returned to said client to begin a transaction;

receiving a submitted request including said form and returned transaction identifier;

testing said returned transaction identifier to determine whether or not said transaction identifier has been previously returned;

if not previously returned, performing said requested transaction and setting said transaction identifier as being returned;

if previously returned, raising an error condition.

9. A client computer system for avoiding duplicate transaction processing in browser/server environment, the system comprising:

client memory means for storing an indicator of browser request submission;

client processing means for detecting a request to submit a browser request to a server;

client processing means for testing said indicator to determine whether said request has been previously submitted;

client response means for raising an error condition and ignoring said request if said test determines the request was previously submitted; and client processing means for submitting said requested request and setting said indicator to indicate submission, if said request was not previously submitted; and thereby reducing network traffic associated with duplicate request submissions.

10. A web server for detecting duplicate transaction requests in a stateless web server environment, said web server having memory means and processing means, the system comprising:

means for assigning a unique identifier to a form;

means for sending the unique identifier in a web page to the browser client;

means for receiving a browser request for a transaction including said unique identifier;

means for testing said unique identifier to determine whether or not a transaction having said unique identifier has been processed;

means for processing said request of said unique identifier has not been previously processed, said means for processing setting an indicator that said unique identifier has been processed; and means for raising an error condition if said unique identifier has been processed.

11. The system of claim 10, wherein said means for assigning a unique identifier includes:

means for requesting a unique identifier; and means for inserting said unique identifier in an form definition in the web page.

12. The system of claim 11, wherein said form definition is in Hypertext Markup Protocol (HTTP) form and said inserting adds said unique identifier as a hidden variable.

13. The system of claim 11, wherein said form definition is in Hypertext Markup Protocol (HTTP) form and said inserting adds said unique identifier as an HREF URL variable.

14. A computer program product having a computer readable medium having computer program logic recorded thereon for avoiding duplicate transactions in a browser/server computer system, said computer program product comprising:

computer program product means for causing a client computer system to detect a browser request submission;

computer program product means for causing the client computer system to determine whether said request has been previously submitted;

computer program product means for causing the client computer to reject said requested submission is not previously submitted or returning an error if previously submitted;

thereby reducing network traffic associated with duplicate request transmissions.

15. The computer program product of claim 14, wherein said computer program product means for causing a computer to detect a browser request submission comprises:

computer program product means for causing a computer to detect pointing device activation of an HTTP "submit" field.

16. The computer program product of claim 14, wherein said computer program product means for causing a computer to detect a browser request submission comprises:

computer program product means for causing a computer to detect pointing device activation of an HTTP hypertext link "HREF" field.

17. The computer program product of claim 14, wherein said computer program product means for causing a computer to test said unique identifier comprises:

computer program product means for causing a computer to store a value of said highest unique identifier for a client;

computer program product means for causing a computer to compare a returned unique identifier to said stored value.

18. The computer program product of claim 14, further comprising:

computer program product means for causing a server computer to assign a unique identifier for a transaction form and embed the unique identifier in a web page sent from the server computer to a browser in the client computer;

computer program product means for causing a server computer to intercept a returned form from the client computer having the unique identifier;

computer program product means for causing a server computer to test the unique identifier to determine whether or not the unique identifier has been previously submitted; and computer program product means for causing a server computer to reject said submitted transaction if previously submitted or to process said transaction and update an indicator for the unique transaction identifier if the unique identifier has not been previously submitted.

* * * * *